April 6, 1948.  R. E. MEADE ET AL  2,439,260
APPARATUS FOR HEATING SENSITIVE MATERIALS
Filed July 26, 1944
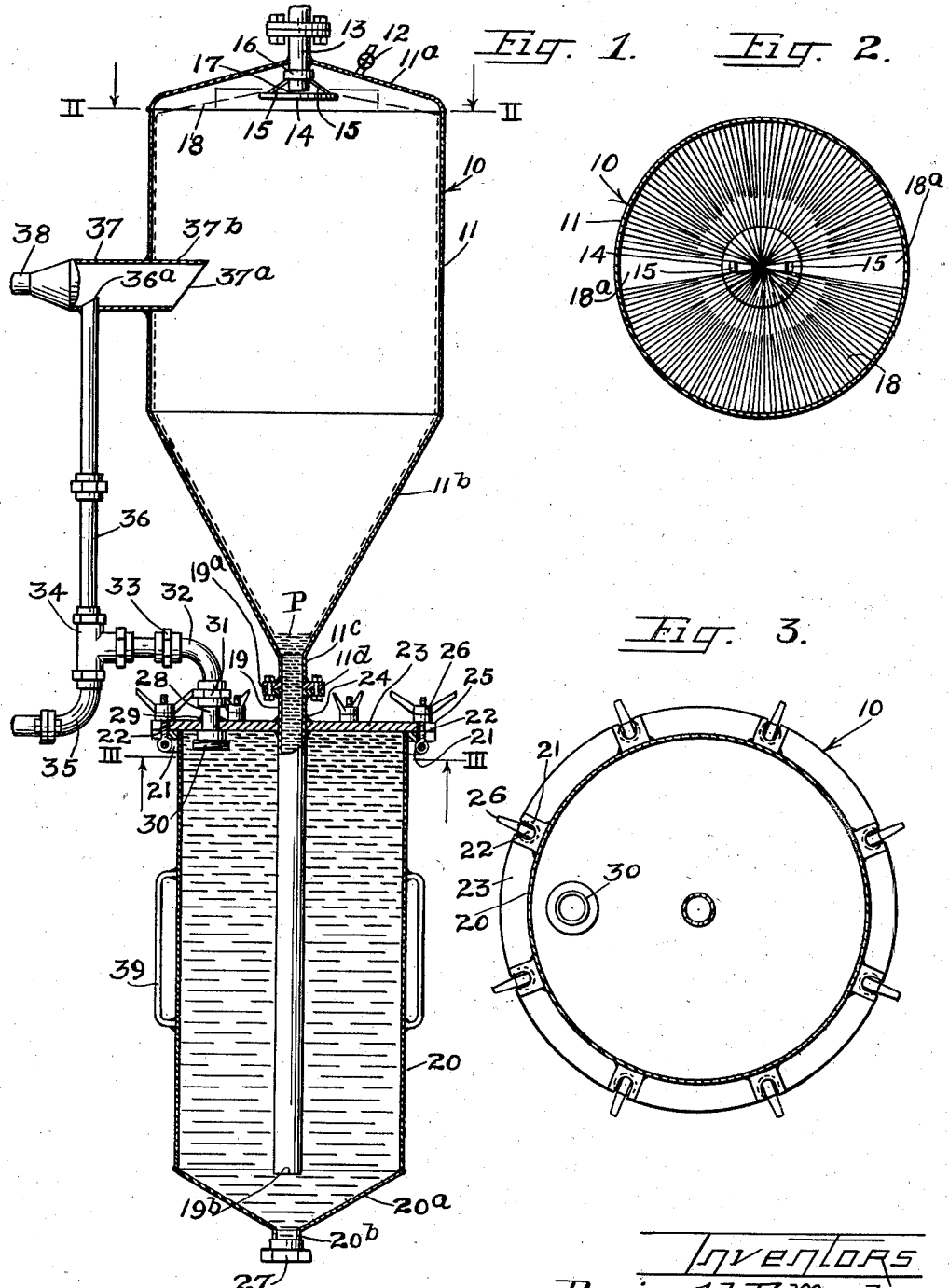

Patented Apr. 6, 1948

2,439,260

UNITED STATES PATENT OFFICE 2,439,260

APPARATUS FOR HEATING SENSITIVE MATERIALS

Reginald E. Meade and John F. Crews, Appleton, Wis., assignors to Western Condensing Company, San Francisco, Calif., a corporation of California Application July 26, 1944, Serial No. 546,706

4 Claims. (Cl. 261—8)

This invention relates generally to apparatus for the heat treatment of heat sensitive materials, particularly food materials such as milk and milk products.

The invention specifically deals with apparatus for heating heat-sensitive flowable materials with steam in such a manner that direct heat transfer from the steam to the material is obtained, making possible the use of steam temperatures which are only slightly above the desired elevated temperatures for the material and thus protecting any heat-destructible elements in the material.

In the processing of milk products it is frequently necessary to heat the liquid material to a definite predetermined temperature, and then hold the material at this temperature for a predetermined period of time. For example in the heat sterilization of milk products, preparatory to further operations such as evaporation, spray drying, fermentation or the like, the material should be rapidly heated to a temperature in excess of 212° F., and then held at such a temperature for a period of time sufficient to complete the extent of sterilization desired. In many processing installations such heat treatment must be carried out upon a continuous flowing stream of the material.

In the past milk products have been treated at pasteurizing or sterilizing temperatures by directly introducing steam into a body of material. A serious difficulty with this arrangement is that it is difficult to maintain a steady flow of steam into the material, and therefore the material is not heated as evenly and uniformly as desired. There is a tendency towards pulsation of the steam flow with a water hammer effect upon the liquid which further tends to make it difficult to maintain a continuous flow of liquid through the device. Local over heating may cause fouling of the sterilizing chamber walls by deposition of adherent viscous, more or less dried out, caramelized or carbonized material. In addition when the flow of the liquid is temporarily interrupted, as may happen from time to time, a very considerable body of the material is still being subjected to the steam.

The invention will hereinafter be specifically described in connection with the heating of whey.

According to the present invention the liquid material being treated, such as liquid whey, is introduced into a suitable treatment chamber provided with generally upright side walls. From the point or region of introduction the liquid is distributed outwardly to contact and flow down over the side walls of the chamber thereby forming a downwardly flowing film of liquid. Steam is continually introduced into the interior of the treatment chamber for intimate heat exchange contact with the liquid. Assuming that an extended predetermined time period of heat treatment is desired, the liquid as it is collected as a pond in the lower part of the treatment chamber is caused to progress through a suitable timing vessel or tank during which time it is held at an elevated temperature. As will be presently explained the holding time within the timing tank and the temperatures employed may be such as to effect a desired degree of heat sterilization of the liquid material.

Since a thin film of whey liquid actually envelopes a large volume of steam, the liquid is in excellent heat-transfer relation with the steam and is quickly heated almost to the steam temperature. As a result, steam temperatures not appreciably exceeding the desired temperature for the heated whey can be used and valuable heat-sensitive solids in the whey are protected. The inner walls of the heat exchange apparatus are continuously washed and kept free from otherwise adherent viscous or solidified products by the flowing film of whey.

If desired, whey or the like may be sprayed into the central steam space enveloped by the film of flowing whey.

The hot whey liquid produced by this invention can be charged into multiple effect evaporators, spray driers, or the like, for the production of dried whey powder which is a valuable food product.

It is, then, an object of this invention to heat flowable materials by causing the materials to form a thin film or sheet enveloping a large volume of steam.

A still further object of the invention is to elevate the temperature of heat-sensitive liquids without deleteriously affecting any of the heat-sensitive materials therein by flowing the liquid down the walls of a tank to envelope a chamber of steam and to avoid accumulation of solid materials on the walls.

A still further object of the invention is to provide a contact heater embodying a tank having means associated therewith for the flowing of a thin film or sheet of liquid material over the interior walls thereof and equipped with a steam inlet which introduces steam into the tank within the sheet or film of liquid to be enveloped by this sheet or film.

A further object of the invention is to provide an apparatus which will make possible continuous flow of liquid material to and from the heat treatment operation, with a predetermined time period of retention for the heat treatment, and without unduly subjecting a considerable body of the liquid material to steam during periods of interruption.

Other and further objects of the invention will be apparent to those skilled in the art from the following detailed description of the annexed sheets of drawings which, by way of preferred examples only, illustrate two embodiments of contact heaters according to this invention.

As shown on the drawings:

Figure 1 is a vertical cross-sectional view, with parts in side elevation, of one form of contact heater according to this invention equipped with a holding or retention tank.

Figure 2 is a horizontal cross-sectional view, taken substantially along the line II—II of Figure 1.

Figure 3 is a horizontal cross-sectional view, taken substantially along the line III—III of Figure 1.

In Figures 1 to 3 inclusive the reference numeral 10 indicates generally one form of contact heater according to this invention.

The contact heater 10 is composed of a cylindrical tank 11 with a domed top wall 11a and a conical bottom portion 11b converging to an outlet neck 11c having an outturned flange 11d on the lower end thereof.

As shown in Figure 1, a bleeder valve or vent 12 is provided in the domed top 11a to permit escape of non-condensible gases, such as air. A feed pipe 13 projects through the apex of the domed top 11a and extends into the top of the tank 11. A flat circular disk 14 is suspended on straps 15, 15 from a collar 16 secured on the pipe 13 in the top of the tank. The pipe 13 terminates in closely spaced parallel relation above the disk 14 to provide an annular discharge orifice 17. Liquid whey is pumped through the pipe 13 and discharged under pressure out of the annular orifice 17 along the top face of the disk 14 to provide an umbrella-like spray or sheet 18 which impinges on the top and side walls of the tank 11 and descends along the side wall and along the wall of the conical portion 11b to the bottom of the tank as indicated by the dotted lines in Figure 1. The inner walls of the tank are thus continually maintained wet with a downwardly flowing film of liquid being heated.

A certain amount of whey is simultaneously sprayed into the central space of the cylinder 11.

The liquid collects at the bottom of the conical portion 11b to form a pond P.

A discharge pipe 19 for the collected liquid has a top flange 19a bolted to the flange 11d and depends vertically into the central portion of a cylindrical holding or retention tank 20. The tank 20 has an open top with a plurality of lugs 21 at spaced intervals therearound swingably supporting swing bolts 22. A flat cover 23 closes the open top of the holding tank 20 and is welded to the upper end of the pipe 19 as at 24. The cover 23 has slots 25 around the periphery thereof receiving the swing bolts 22 and wing nuts 26 on the bolts 22 clamp the cover 23 to the top of the tank.

The tank 20 has a conical bottom 20a converging to a drain outlet 20b closed by a cap 27.

The pipe 19 terminates at 19b at about the upper level of the conical bottom 20a.

The cover 23 has an outlet pipe 28 projecting therethrough and secured in fixed relation thereto by means of a welded bond 29. A fitting 30 is secured on this pipe 28 within the top of the tank 20. The upper end of the pipe 28 is connected through a union 31 with an elbow pipe 32, and this elbow pipe 32, in turn, is connected through a union 33 with the horizontal leg of T fitting 34. The fitting 34 has a drain pipe 35 depending therefrom together with an upstanding pipe 36 extending into the enlarged steam hood or inlet 37. This hood 37 converges to a steam pipe 38 at its outer end and extends through the cylindrical wall of the tank 11. The inlet 37 projects into the tank chamber and has an inclined discharge end 37a. A hood 37b is thus provided in the tank 11 and receives the descending film 18 therearound. The hood prevents this film from flowing into the inlet 37.

The upper end of the pipe 36 is beveled as at 36a and projects into the inlet 37. The direction of slope of the beveled end 36a is such that the velocity of steam flowing through the inlet 37 will create a static pressure head in the pipe 36 to avoid any Venturi action. This makes it impossible for liquid material in the tank 11 to enter the pipe 35 until after it has gone through the tank 20.

As shown in Figure 2, the umbrella-like spray or sheet 18 is interrupted as at 18a, 18a by the straps 15, 15 so that the vent 12 in the top 11a of the tank 11 will communicate with the interior of the tank and enable steam to freely flow into contact with both the upper and lower sides of the spray.

The tank 20 serves as a retention means or holder for liquids collected from the film to maintain this liquid at an elevated temperature for a predetermined period of time. Handles 39 are provided on the tank 20 to facilitate removal of the tank. The wing nuts 26 are readily loosened from the cover 23 and the swing bolts 22 can be swung to out of the way positions permitting the tank 20 to be dropped. The tank is readily drained through the drain outlet 20b.

In operation of the device illustrated in the drawing, raw liquid whey is pumped through the orifice 17 at a continuous constant rate to form the spray or film 18, interrupted as at 18a to permit non-condensibles such as air to be discharged through the bleed-off valve 12. A film of liquid descends around the inner wall of the tank to be collected as a liquid pond near the bottom of the tank 11. Droplets are also showered through the central space of the tank 11. Steam at a pressure corresponding to the temperature desired is introduced through the inlet 37 into the interior of the tank 11 and this steam directly contacts both sides of the spray 18 and the liquid film flowing down the walls of the tank. Excellent heat transfer between the steam, the film and the droplets is thus obtained and the liquid is quickly heated to substantially the same temperatures as the steam. Steam condensate accumulates in the pond P with the heated whey liquid.

The tank 20 serves as a timer to maintain the whey liquid at the elevated temperature for a desired period of time, such as that required to complete sterilization. The liquid collected at the bottom of tank 11 flows through the pipe 19 into the bottom of the tank 20 and must then flow upwardly to the discharge outlet 30 in the top of the tank 20. The liquid is removed through the discharge pipe 35 and this pipe cannot siphon liquid through the pipe 19 because it is vented to the interior of tank 11 through pipe 36.

The raised beveled end or lip 36a on the end of the pipe 36 that projects into the steam inlet 37 prevents any Venturi action from taking place in the pipe 37.

It has been found that steam having a temperature only about 10° higher than that desired for the whey liquid is sufficient to rapidly heat the whey liquid to its desired temperature. Thus steam at 15 lbs. gauge pressure is sufficient to heat the whey liquid to 250° F. Steam at 21 lbs. gauge pressure will heat the whey liquid to 260° F.

While being heated by contact with steam the liquid whey flows downwardly and continually washes the walls of the tank 11. Thus the walls are maintained free of accumulations of solid material such as are highly undesirable in food treatment equipment. It is a simple matter to maintain a uniform and constant flow of steam to the equipment without pulsations or water hammer, and without any tendency to interfere with even continuous flow of liquid through the pipe 13. Should flow of liquid through pipe 13 be interrupted for a temporary period liquid will not be siphoned out of the retention tank 20 but it will be maintained filled with liquid, until flow of liquid through pipe 13 is resumed.

The rate and extent of heating can be accurately controlled by varying the rate at which whey and steam are supplied to the tank.

From the above description it will be understood that the invention provides contact heaters for quickly and efficiently heating flowable liquids containing heat-sensitive solids which burn quite easily, such as milk. The contact heaters include umbrella spray or sheet-forming apparatus, tanks for receiving the spray or sheet as an envelope around a steam chamber into which additional whey may simultaneously be sprayed, and holding or retention tanks receiving the heated liquid to form a pond therefrom and to maintain this pond under influence of heat for a predetermined period.

The contact heaters are readily assembled and disassembled for cleaning and repair purposes, are automatically washed by liquid material flowing therethrough during the operation thereof, do not involve the use of moving parts, and are substantially fool-proof in operation.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A contact heater comprising a container having a top wall, a depending side wall, a converging bottom, a liquids inlet and a steam inlet, a drain pipe associated with the convergent end of the bottom of the container, a holding tank enveloping said drain pipe receiving heated liquid collected therein from the container, said drain pipe terminating adjacent the bottom of the holding tank, an outlet associated with the top of the holding tank for removing liquid therefrom, and means venting said outlet to the interior of the container to prevent siphoning of liquid out of the holding tank and formation of a vapor trap at the top of the tank while holding pressure in the tank.

2. A contact heater comprising a container having a liquids inlet and a steam inlet, a drain pipe projecting from the bottom of the container, a holding tank surrounding said drain pipe, an outlet pipe associated with the top of the holding tank to remove liquid therefrom, and a vent pipe connecting the outlet pipe with the steam inlet and projecting into the steam inlet to maintain a head pressure in the outlet pipe while eliminating trapping of vapor in the top of the holding tank.

3. A contact heater comprising a tank having a domed top wall, a cylindrical side wall, and a converging bottom, a feed pipe projecting through the domed top wall, a plate in said container suspended on said feed pipe in closely spaced relation from the mouth of the feed pipe to cooperate therewith for forming an annular discharge orifice, a drain pipe associated with the convergent end of the container bottom, a holding tank surrounding said feed pipe receiving the drain pipe in the bottom portion thereof, a removable cover for said holding tank secured on said drain pipe, an outlet pipe projecting through said cover into the top of the holding tank, a large diameter steam inlet hood projecting into the container, and a vent pipe connecting the steam inlet hood with the outlet and having a scoop lip projecting into the steam hood to maintain a pressure head in the outlet.

4. Apparatus for effecting direct heat exchange between steam and a liquid which comprises a tank having walls enveloping a space, a spray device in the upper portion of said tank for discharging a sheet of liquid radially outward into the space in said tank for forming a downwardly flowing sheet of liquid on the tank walls, a steam inlet for said tank arranged to discharge live steam into the space in the tank, said tank having an upper gas vent, a first liquids outlet for the lower portion of said tank, a separate tank receiving fluid from said first liquids outlet into the bottom portion thereof, and a second liquids outlet at the top portion of said separate tank whereby the liquid forms a pool in the separate tank acting as a seal for the apparatus.

REGINALD E. MEADE.
JOHN F. CREWS.

REFERENCES CITED

The following references are of record in the file of this patent:

UNITED STATES PATENTS

| Number | Name | Date |
|---|---|---|
| 459,254 | McAuley | Sept. 8, 1891 |
| 585,928 | Crawley | July 6, 1897 |
| 636,000 | Hirt | Oct. 21, 1899 |
| 737,444 | Moore | Aug. 25, 1903 |
| 771,515 | Weiss | Oct. 4, 1904 |
| 978,411 | Tomlinson | Dec. 13, 1910 |
| 1,041,954 | Beyer | Oct. 22, 1912 |
| 2,041,059 | French | May 19, 1936 |
| 2,088,124 | Webre | July 27, 1937 |
| 2,091,606 | Murray | Aug. 31, 1937 |